United States Patent [19]

Gibbons et al.

[11] Patent Number: 5,473,765
[45] Date of Patent: Dec. 5, 1995

[54] APPARATUS FOR USING FLASH MEMORY AS A FLOPPY DISK EMULATOR IN A COMPUTER SYSTEM

[75] Inventors: James H. Gibbons, San Jose; David O. Sovey, Campbell; Donald M. Bellenger, Los Altos, all of Calif.

[73] Assignee: 3COM Corporation, Santa Clara, Calif.

[21] Appl. No.: 184,993

[22] Filed: Jan. 24, 1994

[51] Int. Cl.⁶ .................................................. G06F 12/10
[52] U.S. Cl. ........................................................... 395/500
[58] Field of Search ................................. 395/500, 425, 395/600; 365/189.01

[56] References Cited

U.S. PATENT DOCUMENTS

| | | | |
|---|---|---|---|
| 4,536,837 | 8/1985 | Olson et al. | 395/600 |
| 4,642,759 | 2/1987 | Foster | 395/500 |
| 5,034,914 | 7/1991 | Osterlund | 395/425 |
| 5,070,474 | 12/1991 | Tuma et al. | 395/500 |
| 5,131,089 | 7/1992 | Cole | 395/500 |
| 5,184,256 | 2/1993 | Chikusa | 360/45 |
| 5,218,685 | 6/1993 | Jones | 395/425 |
| 5,222,046 | 6/1993 | Kreifels et al. | 365/185 |
| 5,226,168 | 7/1993 | Kobayashi et al. | 395/800 |
| 5,243,575 | 9/1993 | Sambandan et al. | 365/233.5 |
| 5,285,292 | 2/1994 | Matsuki | 358/456 |
| 5,291,584 | 3/1994 | Challa | 395/500 |

OTHER PUBLICATIONS

Product Literature concerning external drives, internal drives, designer's kit, and memory cards, "Take Advantage of IC Memory Card Technology with Adtron's Family of SolidState Data Drives", ADTRON Corporation, Chandler, Arizona (1992).

Lahti, et al., "Store Data in a Flash Flash-memory ICs offer new options for personal computer storage", BYTE, Nov. 1990, pp. 311-313, 315, and 317-318.

Product Literature "Advance Information Am28F020 262, 144×8-Bit CMOS Flash Memory", Advanced Micro Devices, Sunnyvale, California Mar., 1991, pp. 4-101 to 4-105, 4-108 to 4-128, and 4-130 to 4-140.

Pancucci, "Flashes Which are Intended to Last", Computer Weekly, Apr. 11, 1991, pp. 26-27.

Primary Examiner—Parshotam S. Lall
Assistant Examiner—Viet Vu
Attorney, Agent, or Firm—Haynes & Davis

[57] ABSTRACT

An apparatus for emulating a floppy disk drive using flash EPROMs. The apparatus transfers data between a floppy disk controller and a flash EPROM memory module, wherein the floppy disk controller operates under a first protocol and transmits requests to write data to a floppy disk in response to address marks. The flash EPROM operates under a second protocol. The invention includes control means compensating for the difference in the two protocols. In addition, the control means provides for the situation when power is terminated during the write process. Furthermore, the invention includes a means for organizing and reorganizing data in the flash EPROM to make most effective and efficient use of the flash EPROM memory module.

8 Claims, 7 Drawing Sheets

Organizational Sectors

REORGANIZATION/RECYCLING

APPARATUS FOR USING FLASH MEMORY AS A FLOPPY DISK EMULATOR IN A COMPUTER SYSTEM

BACKGROUND OF THE INVENTION

1. Field of Invention

The present invention relates to a floppy disk emulator and, more particularly, to a floppy disk emulator using flash memory.

2. Description of Related Art

Memory cards have begun to challenge floppy disks as an alternative for storing data and programs for a computer. One form of memory card used to replace a floppy disk is based on flash EPROMs, which offer the stability of non-volatile solid state memory in a form of removable media, needing no power source to sustain the memory. Looking like thick credit cards, flash EPROM cards, also called flash EPROM memory modules, are made of a number of flash EPROM chips in a plastic package.

The most obvious advantages flash EPROM cards have over floppy disks are size and weight. Floppy disks, of whatever size, require a disk drive which adds weight and bulk. Rather than having an actuator arm and recording head for reading and writing information, flash EPROM memory cards use a simple connector, which is more reliable and has a longer life span. Thus, compared with disk drives, flash EPROM memory products offer increased reliability, smaller size and lower weight.

Today, a personal computer's hard disk drive is one of its most power hungry components. A battery operated portable computer supplies a limited amount of power, and hard disk drives use up that power quickly. Most portable computers today require fairly sophisticated power management facilities to extend the amount of time the machine can be used.

A portable computer's power management facility often turns off the hard disk if it is not being used. While this may extend a portable computer's limited battery life, it lowers performance. When the power comes back on, the disk drive's motor can take several seconds to bring it up to speed before disk I/O can begin. A flash based disk needs no warmup. When power is turned on, the data is immediately available. With no waiting, there is no loss in performance. In addition to achieving power savings from an "instant on" flash EPROM memory, there are savings from not having to operate power hungry motors and servos.

Engineers designing new computers can design those computers to be used specifically with flash EPROM memory cards rather than floppy disks. An alternative, however, is to design a flash EPROM drive that emulates a floppy disk drive and floppy disk. Thus, a computer designed to operate with a floppy disk, containing a floppy disk controller, can be used with a flash EPROM memory card device designed to emulate a floppy disk drive and floppy disk. This alternative is preferred because of the multitude of computer users who currently own computers designed to use floppy disks.

Although flash EPROM cards offer many advantages over floppy disks, there are still some problems. A flash EPROM chip may contain thousands of memory cells. A user may write to any individual cell by addressing that particular cell. However, a user may not erase an individual cell. The entire flash EPROM chip must be erased as a whole. Thus, if a given flash EPROM chip in a flash EPROM card is filled with thousands of bytes of data and the user wishes to erase one of those bytes, the user must erase the entire chip. One technique for addressing this problem is to not erase that one byte of data but, rather, rewrite the byte of data somewhere else. However, this solution does not completely solve the problem. Eventually the chip will be filled up and bytes will have to be erased. In addition, it is inefficient use or the memory. Thus, the first problem to solve is how to organize the information on the EPROM to maximize space available for writing. This problem includes managing where to write data to and how to erase flash EPROMs on a flash EPROM card.

A second problem relates to tinning when emulating a floppy disk with a flash EPROM card. The time necessary to write data to a flash EPROM is slower than the time necessary to write data to a floppy disk. When a flash EPROM card is being used to emulate a floppy disk, the floppy disk controller is operating under the assumption that it is writing to a floppy disk; therefore, the floppy disk controller has a tinning protocol significantly faster than can be achieved by the flash EPROM.

A third problem also relates to the time necessary to write to a flash EPROM. Because writing to a flash EPROM takes longer than a floppy disk, the chance of power being terminated during a write process is greater with a flash EPROM card than with a floppy disk. Thus, the designer of a flash EPROM device emulating a floppy disk must take into account errors in data integrity because of the possibility of a power outage during a write operation.

Therefore, it is desirable to provide an apparatus for transferring data between the floppy disk controller of a host computer and the flash EPROM card where that apparatus enables the flash EPROM to emulate a floppy disk such that the timing differences between writing to a floppy disk and a flash EPROM are compensated for, a power outage during a write process is provided for, and data organization on the flash EPROM card is managed such that available space on the card is used efficiently.

SUMMARY OF THE INVENTION

The present invention is directed to an apparatus for transferring data between a floppy disk controller and a flash EPROM memory module in order to emulate a floppy disk. The floppy disk controller operates under a first protocol typical of floppy disks. The floppy disk controller writes data to a floppy disk in response to address marks received from the floppy disk. The flash EPROM memory module operates under a second protocol. One aspect of the present invention comprises a port and a data path for communication between the flash EPROM memory module, and the floppy disk controller. In addition, control means are provided for managing the port and data path, creating an interface between the floppy disk controller and the flash EPROM memory module. This interface compensates for the different protocols of the floppy disk controller and the flash EPROM memory module.

In order to emulate a floppy disk, the flash EPROM memory module is broken up into blocks of memory and each block is further broken up into a plurality of data sectors and organizational sectors. The data sectors contain the user data from the computer. The organizational sectors contain organizational information about each data sector. Included in the organizational information is status information. The status information includes at least five states: valid, obsolete, invalid, erase, and allocated.

According to another aspect of the invention, a power-up means provides for the situation when power is terminated during a write process. The power-up means includes a checking means which reads the organizational information for all the data sectors stored on the flash PROM memory module. In addition, there is a marking means that is responsive to the checking means. The marking means will mark a sector obsolete if it found that power was terminated before the write operation was complete. Power is determined to have been terminated before the write operation was complete if a sector is allocated for storage of data without the data being valid. The checking means also looks for two sectors that have the same floppy address. If it finds two such sectors, the marking means will mark one of those two sectors as obsolete according to the following rule: if one of the two sectors is followed by an erase sector, mark the other sector obsolete, or else randomly mark one of the two sectors obsolete.

According to another aspect of the invention, a reorganization means is provided. This reorganization means will become active only after a minimum period of floppy disk idle time. Reorganization means is used to reorganize the data on the flash EPROM memory module to make efficient use of the memory and to provide for erasing data. Reorganization includes looking for obsolete sectors and invalidating them by preparing the sectors for erasing. A determination means will determine which block should be erased and which block should be filled with data. Then, data is shuffled, by a shuffle means, such that the blocks that were targeted to be filled are actually filled. The blocks that were emptied are then erased.

Other aspects and advantages of the present invention can be seen upon review of the figures, the detailed description, and the claims which follow.

DETAILED DESCRIPTION

Figure 1:
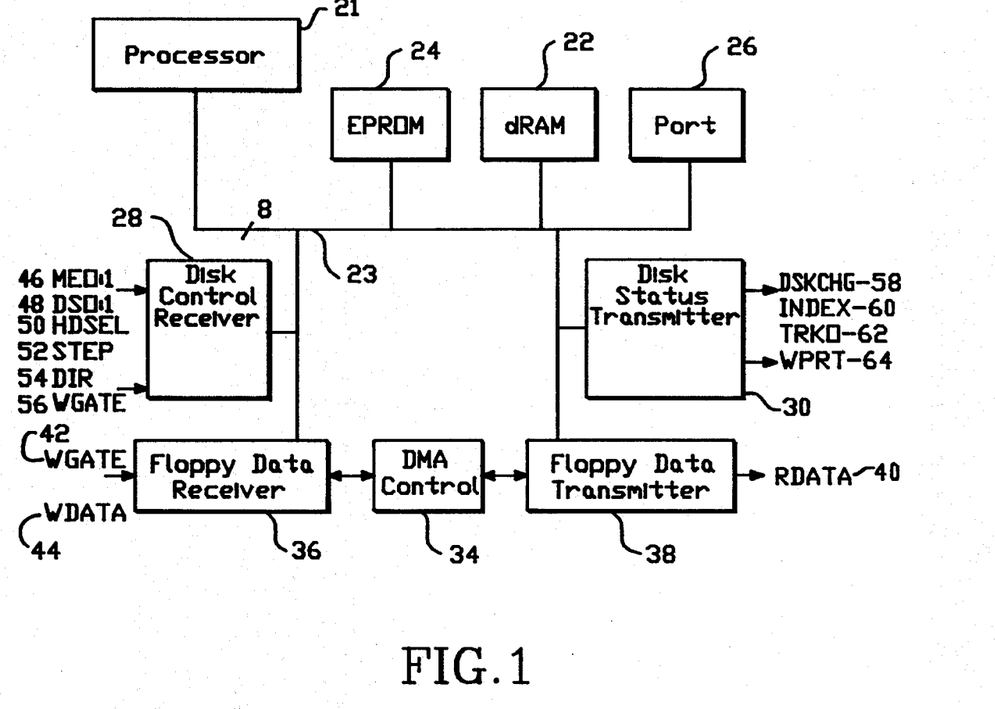
FIG. 1 is a block diagram of the present invention.
Figure 2:
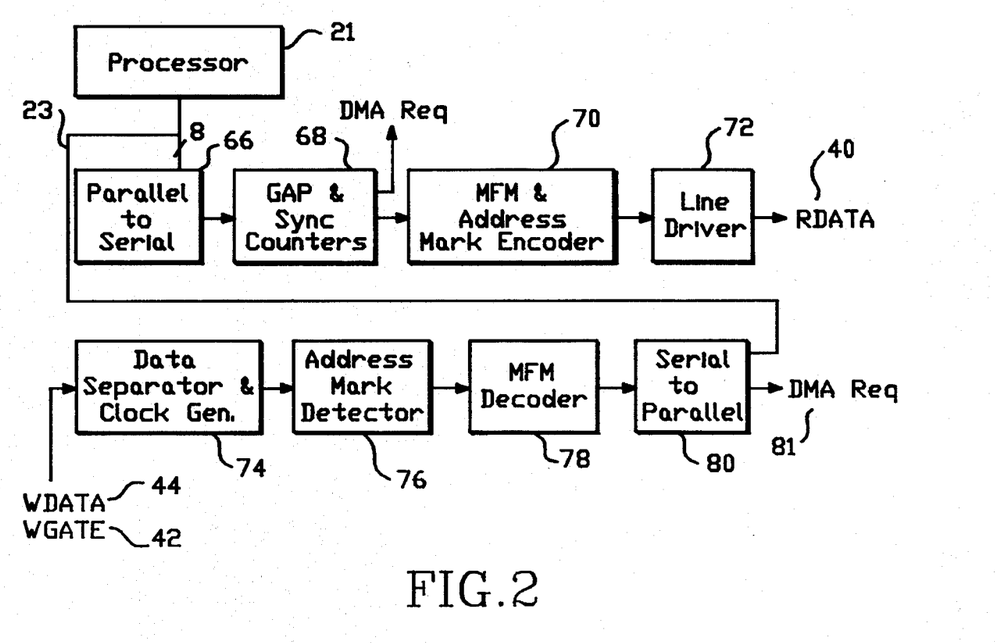
FIG. 2 is a more detailed block diagram of the data path between the processor and the floppy disk controller.
Figure 3:
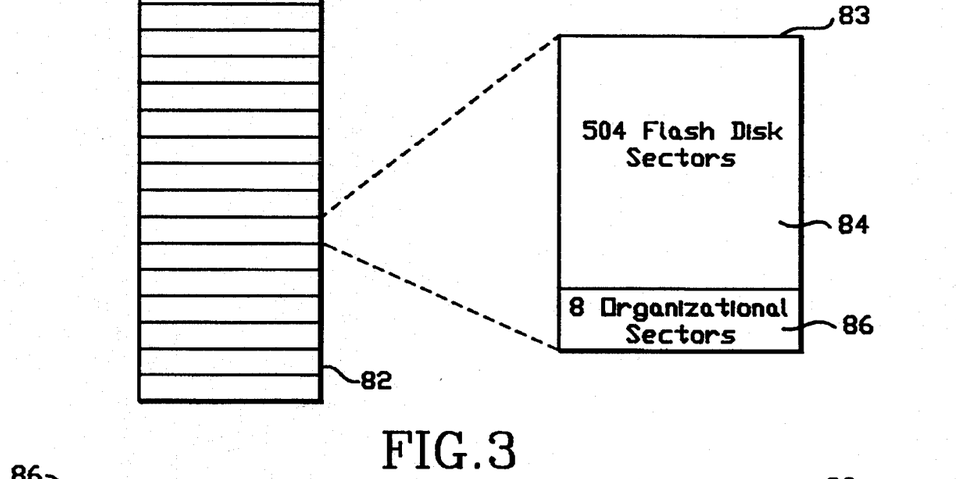
FIG. 3 is a block diagram of the flash EPROM memory module.
Figure 4:
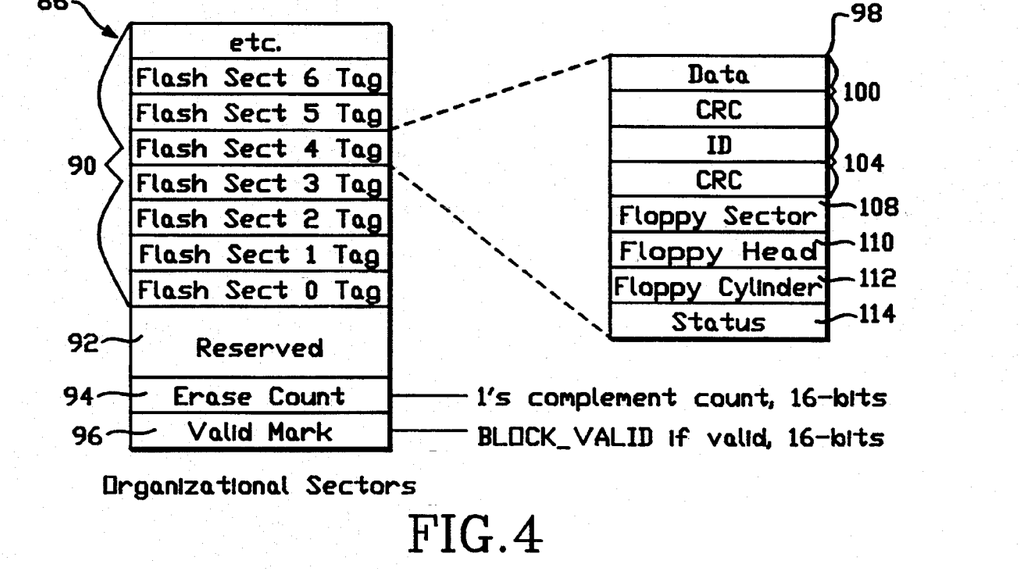
FIG. 4 is a block diagram of an organizational sector.
Figure 5:
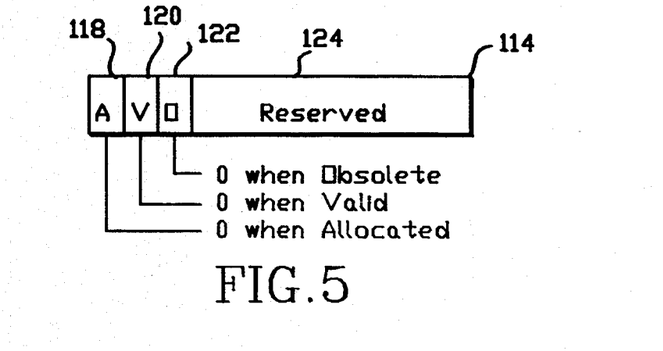
FIG. 5 is a diagram of the status byte found in an organizational sector.

A detailed description of the preferred embodiment of the present invention is provided with respect to FIGS. 1–10. FIGS. 1 and 2 provide block diagrams of the hardware necessary for an embodiment of the present invention. FIGS. 3–5 provide block diagrams of the memory organization of the EPROM. FIGS. 6–10 provide flow charts to illustrate how various aspects of the present invention operate.

FIG. 1. illustrates a block diagram of the hardware for an embodiment of the present invention. Included is a processor 21 which can comprise an off-the-shelf processor chip; for example, a 16 MHz 80C188 Processor. Included as part of the processor 21 would be such processor support logic as a CPU oscillator, reset circuitry, address bus latches and data bus buffers (not shown). This embodiment includes a 256K byte dRAM system 22 operated in normal RAS-CAS mode and used for both local variables as well as data buffers. The dRAM memory 22 consists of two 256 k×4 devices organized as 256 k×8 bits. A synchronous ready signal is generated by a dRAM control state machine, part of the dRAM memory system 22, and provided to the processor 21. Refresh for the dRAM 22 is provided by a refresh control unit in the processor 21. Although the best mode contains a dRAM, the dRAM can be replaced by other memory elements.

The EPROM memory system 24 consists of an 8-bit data path provided by one 32-bit socket. The EPROM memory system 24 can be an EPROM or flash EPROM. The EPROM memory system 24 is used to store firmware. This is not the EPROM memory module that is being used to store the floppy data in lieu of a floppy disk.

This embodiment includes a port 26 which serves as an interface for one PCMCIA PC Card, which is the flash EPROM memory module. This interface is not designed to be a general purpose PC card socket. It is intended to support flash EPROM cards only.

Disk control receiver 28 receives and registers the standard floppy control signals. The control signals include motor enable (MEO:1) 46, drive select (DSO:1) 48 head select (HDSEL) 50, step (STEP) 52, directional step (DIR) 54 and write gate (WGATE) 56. The floppy disk controller (not shown) uses motor enable 46 to enable and dis-enable a motor in a floppy drive. In this embodiment, motor enable is connected to an interrupt input of the processor 21. Drive select 48 is used by the floppy disk controller to select which drive of a drive configuration it wishes to communicate with. Step 52 signals the actuator of a floppy disk to step over one track. Direction 54 is used by the floppy disk controller to tell the actuator which direction to step in, that is, to step towards the inner portion of the disk or the outer portion of the disk. The write gate signal 56 is used to trigger the start of a write process. Write gate 56 is also connected to an interrupt input of the processor 21.

Disk status transmitter 30 transmits the standard floppy status signals shown. These signals are stored in an internal control register controlled by firmware. At reset, all lines are automatically set to their inactive state. The four signals are Disk Change (DSKCHG) 58, Index (INDEX) 60, Track 0 (TRK0) 62 and Write Protect (WPRT) 64. The Index signal is used to send a pulse, once per floppy disk rotation, as an absolute positioning signal. Typically, this signal is used during formatting or for error correction. The Track 0 signal indicates that the disk drive head is at Track 0 of the floppy disk. Write Protect indicates that the floppy disk has been protected such that it can be read from but not written to. Disk Change indicates that since the last floppy disk controller interrogation, the floppy disk in the drive has been removed and another floppy disk has been inserted.

Data is transferred to the flash EPROM memory module interfaced to port 26 using direct memory access (DMA). DMA is controlled by the DMA control module 34. The DMA control module 34 may or may not be part of the actual processor 21. It is noted that the 80C188, the preferred processor 21, has external DMA channels used for the floppy serial data ports. The DMA control module sends out a signal DMA_READY (not shown). DMA_READY is used to inform the hardware that the DMA channels have been properly set up and DMA requests are enabled. When the DMA_READY signal goes inactive, the Floppy Data Transmitter 38, to be discussed later, finishes sending the current sector of data, if any, and starts sending "GAP" data bytes until the DMA_READY signal is activated. The Floppy Data Receiver 36, to be discussed below, does not examine the data being received unless the DMA_READY signal is active. If the DMA signal goes inactive during reception, the Floppy Data Receiver 36 will complete receipt of the current sector of data and then stop until the DMA_READY signal is reactivated.

The Floppy Data Receiver 36 receives write data (WDATA) 44, and write gate (WGATE) 42 from the floppy disk controller. The floppy data transmitter 38 sends read data (RDATA) 40 to the floppy disk controller. Both the floppy disk transmitter 38 and the floppy disk receiver 36 will be described in more detail below with respect to FIG. 2.

FIG. 2 illustrates a more detailed block diagram of the data path between the floppy disk controller and the processor 21. Processor 21 is connected to bus 23 which is 8 bits wide. There are two serial data channels to the floppy disk controller; the write channel from the floppy disk controller to the processor 21, and the read channel from the processor 21 to the floppy disc controller. These two channels operate independently. The read channel includes a Parallel to Serial Converter 66, Gap and Sync Field Counter 68, MFM and Address Mark Encoder 70 and Line Driver 72. These four devices comprise the floppy data transmitter 38 depicted in FIG. 1. The output of the Line Driver 72 is Read Data (RDATA) 40, which is sent to the floppy disk controller.

The write channel consists of a Data Separator and Clock Generator 74, an Address Mark Detector 76, an MFM Decoder 78, and a Serial to Parallel Converter 80. These four devices comprise the floppy data receiver 36 depicted in FIG. 1. The Floppy Data Transmitter and Floppy Data Receiver may share common logic. The Parallel to Serial Converter 66 and Serial to Parallel Converter 80 are necessary because the floppy disk controller accepts serial data while bus 23 uses parallel data. In one alternative embodiment of the invention, the entire serial data interface can be contained within a single programmable logic device. Both channels interface to the processor 21 via the DMA channels within the processor itself. When the 80C188 processor is used, the read channel uses DMA REQUEST 0 and the write channel uses DMA REQUEST 1. The signal DMA_READY (not shown) is used to control the operation of both serial channels.

Address Mark Detector 76 examines the data stream coming from the floppy disk controller. In this preferred embodiment, the address mark detector 76 examines the data stream looking for 3 bytes of hex pattern "A1" with missing clock bits at the clock position, the clock 5 position relates to the MFM encoding. That hex pattern signals the beginning of 514 bytes of data.

Gap and Sync Counter 68 is used as part of the read channel to send gap data, hex "4E," to the floppy disk controller when the read channel is inactive. It also sends sync data, hex "00" when the read channel needs to synchronize the floppy disk controller with the read channel. The read operation will be discussed in more detail below with respect of FIG. 6.

The MFM and Address Mark Encoder 70 is used to encode data sent to the floppy disk controller. The MFM Decoder 78 is used to decode data received from the floppy disk controller. The two most popular encoding schemes used on floppy disks are FM (frequency modulation), and MFM (modified frequency modulation). FM defines a bit cell for each bit of data. Each cell contains a position for a clock pulse and a position for a data pulse. Each of these positions is referred to as a window. The clock pulse is present in every cell and a data pulse is present only if the data bit for that cell is a 1. When this data is read back from a disk, a read clock can be generated from the clock pulse of the signal.

FM encoding was the first method used for recording data on a floppy disk. It is still used in some low cost systems where storage capacity is not a critical issue. This method works very well and requires relatively simple circuitry to separate the clock pulse and the data pulses when the data is read back. However, only 50% of the usable disk space is used for the recording data. The other 50% is used to record clock pulses.

MFM encoding allows 100% of the useful disk space for storing data, and is currently the most widely used recording format used for floppy disks. MFM defines a bit cell for each bit of data, similar to FM. Again, each cell contains a position for a clock pulse (clock window) and a position for a data pulse (data window). A data pulse is present if the data bit is 1. A clock pulse is present only if the data bit is 0 and the data bit in the previous bit window was a 0. Because MFM requires fewer pulses to encode the same amount of data, the information can be stored in half the area required for FM encoded data. The only drawback of MFM is that it requires a more sophisticated read/write head and accompanying electronics. It also requires a higher precision data separator than FM in order to resolve the location of each pulse more precisely than necessary with FM. This higher precision data separator required by MFM can be found in the Data Separator and Clock Generation Unit 74.

FIGS. 3–5 illustrate the organization of the flash EPROM memory module. In the preferred embodiment, the flash EPROM memory module is a 4-megabyte card containing sixteen 256 k×8 flash EPROMs. FIG. 3 is a block diagram of a flash EPROM memory module 82 made up of 16 flash EPROMs. Each flash EPROM is a block 83, thus, there are 16 blocks in the memory. Each block will be separated into 512 sectors, 512 bytes per sector. These will be referred to as flash sectors and should be distinguished from floppy disk sectors. Floppy disk sector, floppy head and floppy cylinder make up the address assigned to data by the floppy disk controller, this is called the floppy address. The floppy address is like a virtual address which represents where the data would be stored on a floppy disk. This embodiment emulates a floppy disk. It does not have a dedicated location for each floppy address; therefore, when the device of the present embodiment stores data, it must also store the floppy address. Storage of the floppy address is discussed below.

As stated above, each block has 512 sectors. Of these sectors, 504 sectors are used to store data (data sectors 84) and 8 sectors are used to store organizational information (organizational sectors 86). The organizational information will correspond by position to the flash sectors in the block 83. There will be 8 bytes of organizational information per flash sector. Thus, for a given block 83, there will be 504 flash data sectors 84 and 8 organizational sectors 86. Since there are only 8 organizational bytes per flash sector, and there are 504 flash disk sectors per block, there will be 64 bytes of unused space in the organizational sectors. The additional 64 bytes available in the organizational area for each block can be used to keep a record of erasures and to provide a general indication of validity. Other uses may be found as well.

The layout of the organizational sectors is illustrated in FIG. 4. The organizational sectors 86 of each block 83 will contain an 8-byte tag for each disk sector (the set of tags are labelled 90), Erase Count 94 and a Valid Mark 96. Erase Count 94, Valid Mark 96 and Reserved Block 92 represent the 64 bytes on the unused space referred to in the above paragraph. The Valid Mark 96 will be a 16-bit pattern chosen to be in an unlikely intermediate state during erasure. For example, if the valid mark 96 is 'OXFFFF,' and if the rest of the block is OXFFFF, then the block is erased. If the Valid Mark 96 is BLOCK_VALID (a predefined constant), then the block will be presumed to contain valid data. If the Valid Mark has any other value, it will be assumed that the block is obsolete. Obsolete blocks will be discussed in the following paragraphs.

The Erase Count 94 will be kept in a 1's complement form. With 'OXFFFF' representing zero erasures and 'OXFFFE' representing one erasure, etc. The erasure count will be used to prevent overuse of a particular block. The sector tags 90 are stored in positions that correlate to those of the flash disk sectors in the remainder of the block. A tag 98 for a flash sector that currently contains valid data will contain all of the following: a 3-byte sector ID consisting of floppy cylinder 112, floppy head 110, and floppy sector 108, a 2-byte identification cyclic redundancy code 104, a 2-byte data cyclic redundancy code 100 and an additional Status Byte 114. A tag of all OXFFF bytes represents a currently erased block. A tag of all OXOO bytes represents a block that is currently prepared for erasure.

The flash disk sectors may be in any of a variety of states. They may be erased, allocated, valid, obsolete, and invalid. Erased means that the flash sector is ready to be allocated as an emulated floppy sector. In the allocated state, the flash sector has been allocated to represent a floppy disk sector, and the writing of the data for that sector is in progress. In the valid state, the flash sector contains valid data corresponding to an emulated floppy disk. In the obsolete state, the data has been replaced by data in another flash sector but with the same floppy address. The old data is possibly in the process of being prepared for erasure. That is, the old data is being overwritten with zeros. In the invalid state, the flash sector has been completely prepared for erasure.

The content of the Status Byte 114 is illustrated in FIG. 5. Although the Status Byte. 114 has 8 bits, this embodiment only uses the first three bits. The allocated bit 118 is set to O when the flash disk sector is allocated to represent a particular floppy disk sector. This is done before the data itself has been written to the flash sector. At this time, the floppy disk sector number is also written into the respective tag. The Valid bit 120 is set to O when the flash disk sector has been completely written. It is important for the sake of data security that a single bit transition be used. The Obsolete bit 122 is set to O when the data in that sector has been replaced by data in another flash sector, but with the same floppy address, or when the track containing the floppy disk sector has been formatted.

The previous paragraphs discuss the organization and hardware of the preferred embodiments. The following paragraphs explain the operation of the preferred embodiment, beginning with the read process.

Read Operations

Whenever the motor is on and there is no write in progress, a read operation will be in progress. Whenever a step takes place, preparations for a new read operation will take place. A read operation will be suspended in the event of a write operation.

Referring to FIG. 1, when a steady state for reading has been achieved, the entire track will be stored in the dRAM 22. In addition to the data for each track, the dRAM 22 will also contain the address mark and sector headers. The address mark sector headers and the individual data areas will be preceded by an address mark pattern and followed by CRCs. All this data will be stored contiguously in the dRAM 22 in a buffer allocated for this purpose. The buffer will be about 18.5 k bytes. A DMA channel will be allocated for reading. Data will be fetched from the DMA channel by asserting a DMA request. In response to this DMA request, the processor will perform a byte read from the dRAM 22, then a byte write to the read channel. A ready signal will also be present (not shown). The ready signal will be controlled by the firmware. It will be used to achieve flow control. When the ready signal is asserted, data may be fetched and read from the DMA channel. When the signal is de-asserted, the read channel will send gap bytes until the ready signal is again asserted. Details regarding the management or the DMA channel are dependent upon the processor used. Bytes of data will continuously be sent until all of the data from a sector has been sent. Then, the firmware will start sending data from the next sector on the track. This next sector is the sector with the next floppy address, which means the next sequential floppy sector on the same floppy track. When the firmware determines that the last sector on the track has been transferred, it will delay for an appropriate index gap time, produce a pulse and then resume the read data transfer from the start of that track. A new track will not be read until a step command is received from the floppy disk controller.

When a step takes place, or when the head selection changes, the data in the dRAM 22 will need to be updated. Upon detecting either a step pulse or a change in head selection, the firmware will merely de-assert the ready signal.

As has been noted above, the firmware will continuously be aware of the rotational position. This will allow the firmware to begin its data preparations at what would normally be the next sector. Read preparations will involve the preparation of sector IDs and data with appropriate address marks and CRCs. The processor preparing data is expected to run at approximately the read data rate of a floppy disk. However, it might be slightly slower in responding to a change of head selection than a real floppy disk drive. This differential, if it exists, will be on the order of 5 to 10 milliseconds.

Figure 6:
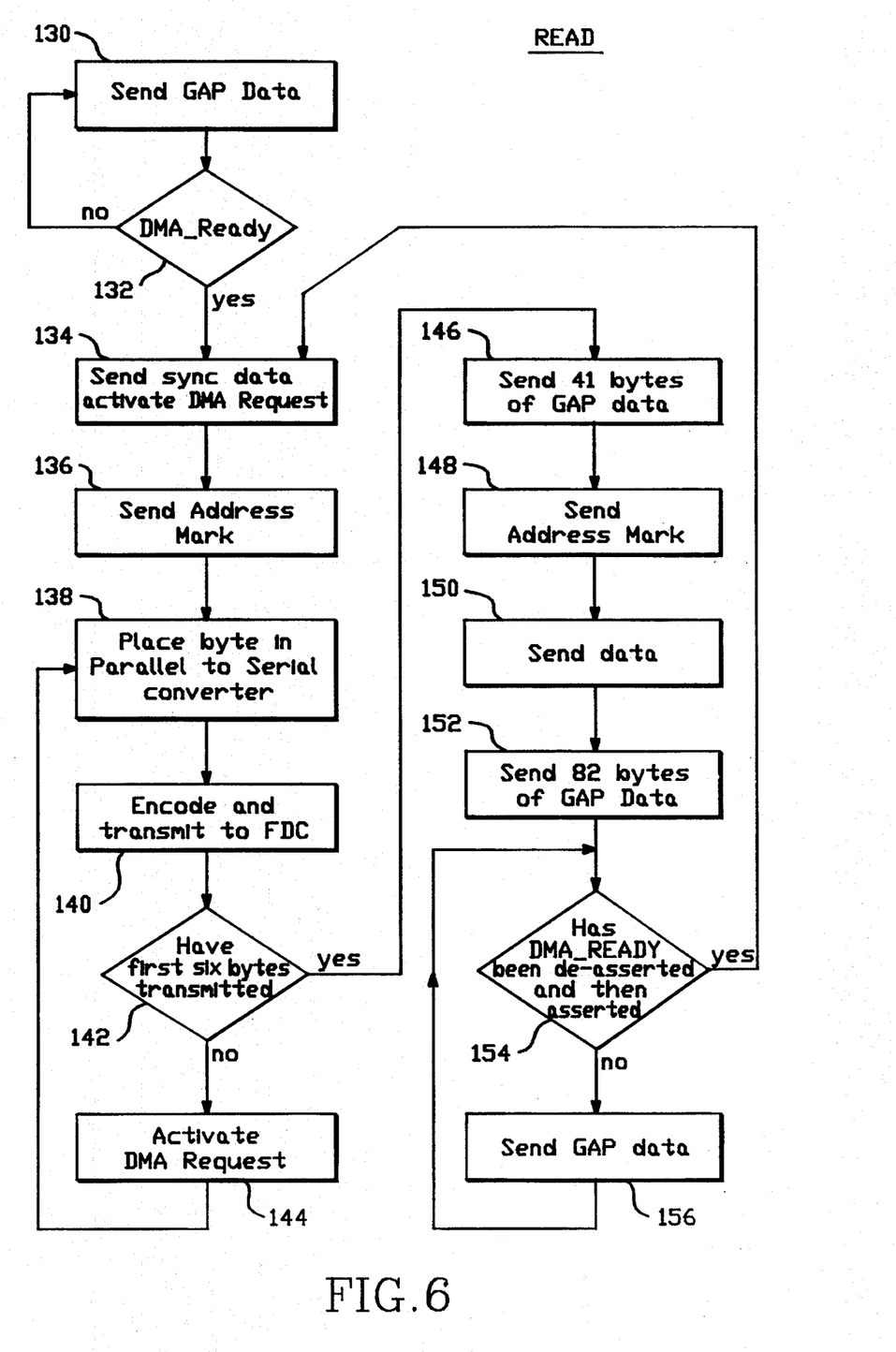
FIG. 6 is a flow chart describing the read process for reading data from the flash EPROM to the floppy disk controller.

FIG. 6 illustrates the steps to implement the read process. As stated above, the read channel will operate continuously unless there is a write operation. While the read channel is inactive, it sends gap data bytes (step 130), hex code "4E," to the floppy disk controller. The read channel will continuously send the gap data bytes until the DMA_READY signal is asserted (step 132). When the DMA_READY signal is active, it is indicating that the firmware has programmed the DMA controller and the processor to send and receive data and the serial channel is enabled. After receiving the DMA_READY signal a step 132, and upon completing the transmission of the current gap byte, the read channel starts sending 12 bytes of sync data hex "00" (step 134). At the same time it activates DMA_REQUEST which causes the processor to place in the Parallel to Serial Converter 66 the first byte of information.

After the sync bytes have been sent, the read channel sends the address mark followed by the sector header information which consists of the floppy sector 108, floppy head 110, and floppy cylinder 112, shown in FIG. 4. When the address mark has been sent, the first of the data bytes is serialized in the Parallel to Serial converter 66 (step 138) and encoded in the MFM Encoder 70 driven by Line Driver 72 to the floppy disk controller (FDC) (step 140). The DMA will continue byte by byte until the entire sector has been sent to the floppy disk controller. The read channel Parallel to serial Converter 66 is double buffered so 1 byte may be in the process of being transmitted while the next byte is being received from the DMA controller. Once the read channel has sent the address mark and the next 6 bytes of data (step 142) it automatically sends 41 bytes of gap data (step 146). This is the gap between the sector header and the user data field. The 6 bytes of data sent along with the address mark include the floppy disk sector, floppy head, floppy cylinder and CRC. After the 41 gap bytes of data have been sent to the floppy disk controller (step 146) the read channel automatically inserts the address mark (step 148) and then sends 514 bytes of data (step 150), followed by the intersector gap (step 152). The first byte stands as the data mark identifier and the last byte is the CRC byte. The 512 bytes in the middle are user data. As with the sector header, the firmware supplies the required bytes and the hardware transmits them without any special processing.

The read channel will continue to send gap bytes until the DMA_READY line is de-activated and then reactivated (step 154). If the DMA_READY line is deactivated during the time the read channel is transmitting data, the read channel will continue operating until the next intersector gap is reached and then start sending gap data until the read signal is reactivated. A new DMA_READY signal may be sent at any time during the reading of a sector. At least 82 bytes of intersector gap will be sent (step 152). If the DMA_READY signal is not active when the end of the minimum gap has been reached, the gap will be stretched until DMA_READY becomes active.

The Write Process

While reading is taking place, a DMA channel will be allocated for writing. That channel will point to a separate buffer area in the dRAM 22 large enough for a single sector of data with its accompanying organizational information.

When a write operation takes place, the firmware will immediately de-assert the ready signal to the read channel. The ready signal will not be re-asserted until the write operation is entirely complete. Other possible schemes of writing could be employed with somewhat higher performance. This approach, however, provides the highest degree of data integrity. It also allows the use of a minimum amount or RAM, thus reducing system costs.

As soon as it is determined that the write process will begin, a currently erased flash disk sector will be allocated. The data will be written to that sector, then that sector will be marked valid, and finally the flash disk sector that previously represented this floppy disk sector, if any, will be marked obsolete. The entire write process should take approximately 15 to 20 milliseconds in this embodiment. This is much slower than a floppy disk. Thus, the gap following the data will be extended by about 11 to 16 milliseconds as the ready signal for the read channel is withheld; therefore, causing the read channel to delay sending the next address mark.

It should be noted that the write procedure described above is very secure. The new data is entirely written before the old data is marked obsolete. This is a very brief period of time during which both the new data and the old data are both marked valid on the flash disk. If power should fail during this time, a decision would have to be made on the next power-up. This power-up process will be discussed later. If the flash disk is very full and if a very long series of write operations take place, it may be necessary to recover erase sectors by the recycling operation before the sector can be written. The recycling operation is discussed later. The situation, however, is deemed to be very unlikely given that the flash EPROM card of this embodiment holds 4 megabytes of data, while the floppy disk typically will not hold more than 2.8 megabytes of data.

Flash disk sectors will be allocated sequentially within the disk blocks. The block from which sectors are allocated will be that which currently has the smallest number of erased sectors. Looking at FIG. 7, the write channel remains idle when the write gate signal from the floppy disk controller is inactive. As can be seen from steps 160, 162 and 164, 166, if either DMA_READY or WRITE_GATE is inactive, the write process will be idle and the read process will continue. When DMA_READY and Write_Gate are active, the write process begins. The write channel first waits 2 byte times (step 168) and then locks the MFM Decoder 78 to the sync bytes, (step 172) hex "00" being written by the floppy disk controller. The write channel continues examining the data stream and throwing away data until it receives the 3 bytes of the hex pattern "A1" with missing clock bits (step 174). This is the address mark.

Figure 7:
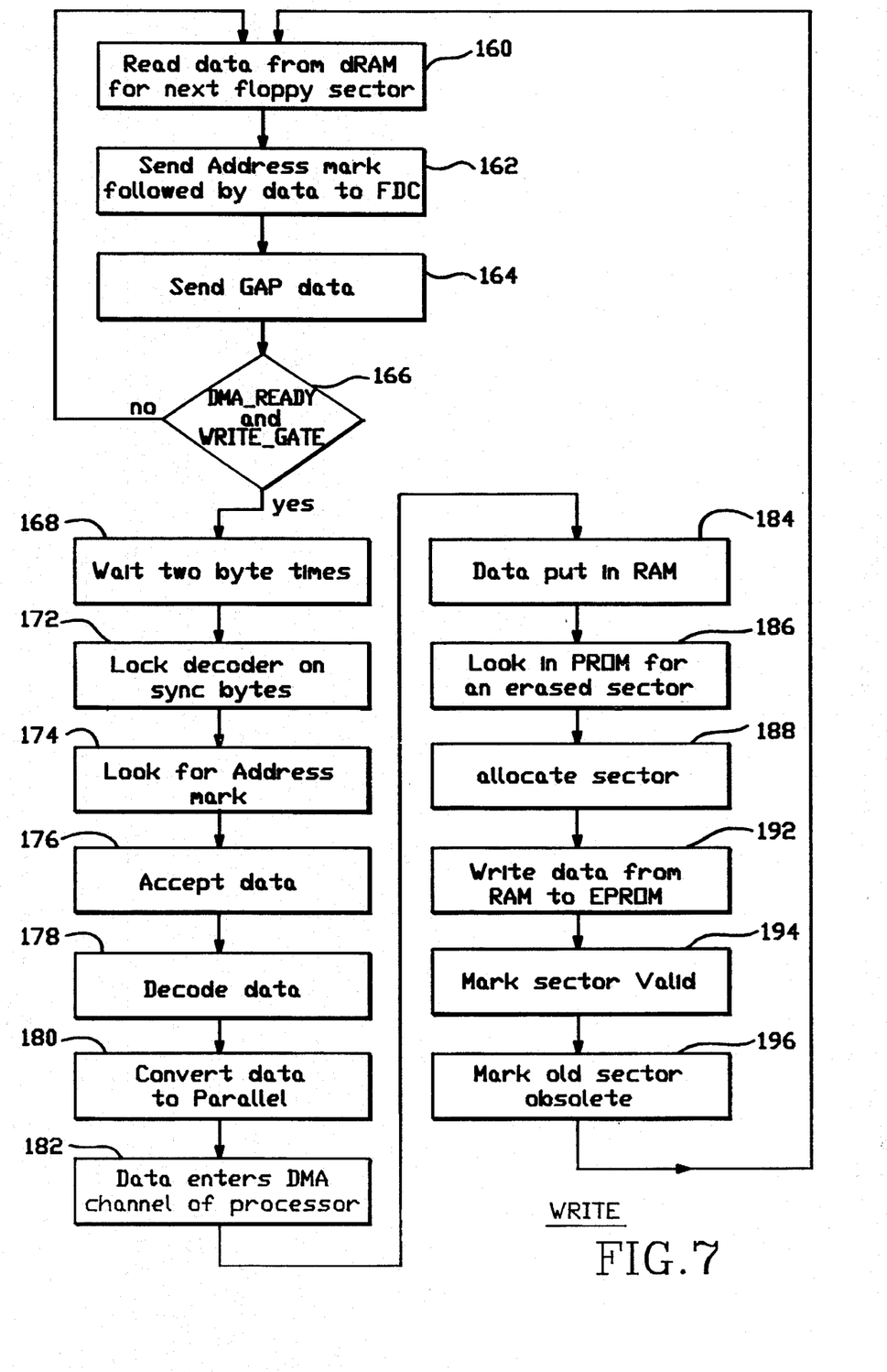
FIG. 7 is a flow chart of the write process for writing data from the floppy disk controller to the EPROM.

After receiving the address mark, the write channel accepts 514 bytes of data (step 176) and, after decoding the data (step 178), the data is sent byte by byte through the DMA controller to the processor 21 (steps 180 and 182). The write channel Serial to Parallel Converter 80 is double buffered.

The address mark is not sent through the DMA channel. The presence of the mark is assumed by the firmware. Also, the channel does not pertain any special operations on the first and last bytes it receives even though they are the data mark identifier and the CRC byte, respectively. These two bytes are treated the same as any other byte by the hardware. The hardware does not count the bytes that are received. It will accept any number of bytes after receipt of an address mark pattern until the write gate is de-activated. However, since the floppy disk controller assumes that it is writing to a floppy disk and a floppy disk only takes 512 bytes per sector, the floppy disk controller will only send 512 bytes of user data.

After the data is sent to the processor, it is then put into the dRAM 22 (step 184). The firmware will then look in the flash EPROM memory module for an appropriate sector to store the data. The sector will be chosen from the block with the smallest number of erased sectors. Within that block the firmware will look for the first erased sector it finds (step 186). The firmware will then mark that sector as allocated (step 188) and then write the data from the dRAM 22 to the flash EPROM memory module via port 26 (step 192). After writing is complete, the new sector will be marked valid (step 194) and then the old sector will be marked obsolete (step 196).

The old sector is the sector where valid data for that particular floppy disk address previously resided. The floppy disk controller has now written over that data. As described above, the apparatus does not write over that data in the same spot in the flash EPROM memory module. Rather, it marks the old data as obsolete and then writes the new information in another location on the flash EPROM memory module. The new information is called the new sector and the old information is called the old sector. Both the new sector and the old sector have the same floppy address. After the old sector is marked obsolete (step 196), the write process is over. The write channel will remain inactive until both DMA_READY and WRITE_GATE have been de-asserted and re-asserted. Thus, the read process will start and a new address mark will be sent by the read channel to the floppy disk controller.

The floppy disk controller will not re-assert write gate until it gets a new address mark. Therefore, even though the write process of a flash EPROM takes longer than the write process of a floppy disk, the difference is compensated for because the floppy disk controller is fooled into thinking that the write process is not completed because a new address mark is not sent. The floppy disk controller remains idle waiting for the address mark to be sent. Thus, the timing of the write process remains secure.

Power-Up

Because the writing process to the flash EPROM memory module takes longer than writing to a floppy disk, the risk of power failure during a write operation is increased. Thus, this embodiment provides for protection of data from power failure. If power fails after the allocation of a flash disk sector or before it is completely written and marked valid, that sector will be discovered on power-up and marked obsolete. In the normal course of recycling it will be recovered. Recycling will be discussed later.

If power fails after the new sector has been marked valid, but before the old sector has been marked obsolete, two sectors will exist corresponding to the same floppy disk sector. If one of these is found to be followed by an erased sector, it will be chosen. Otherwise, an arbitrary decision will be made. The sector not chosen will be marked obsolete.

Figure 8:
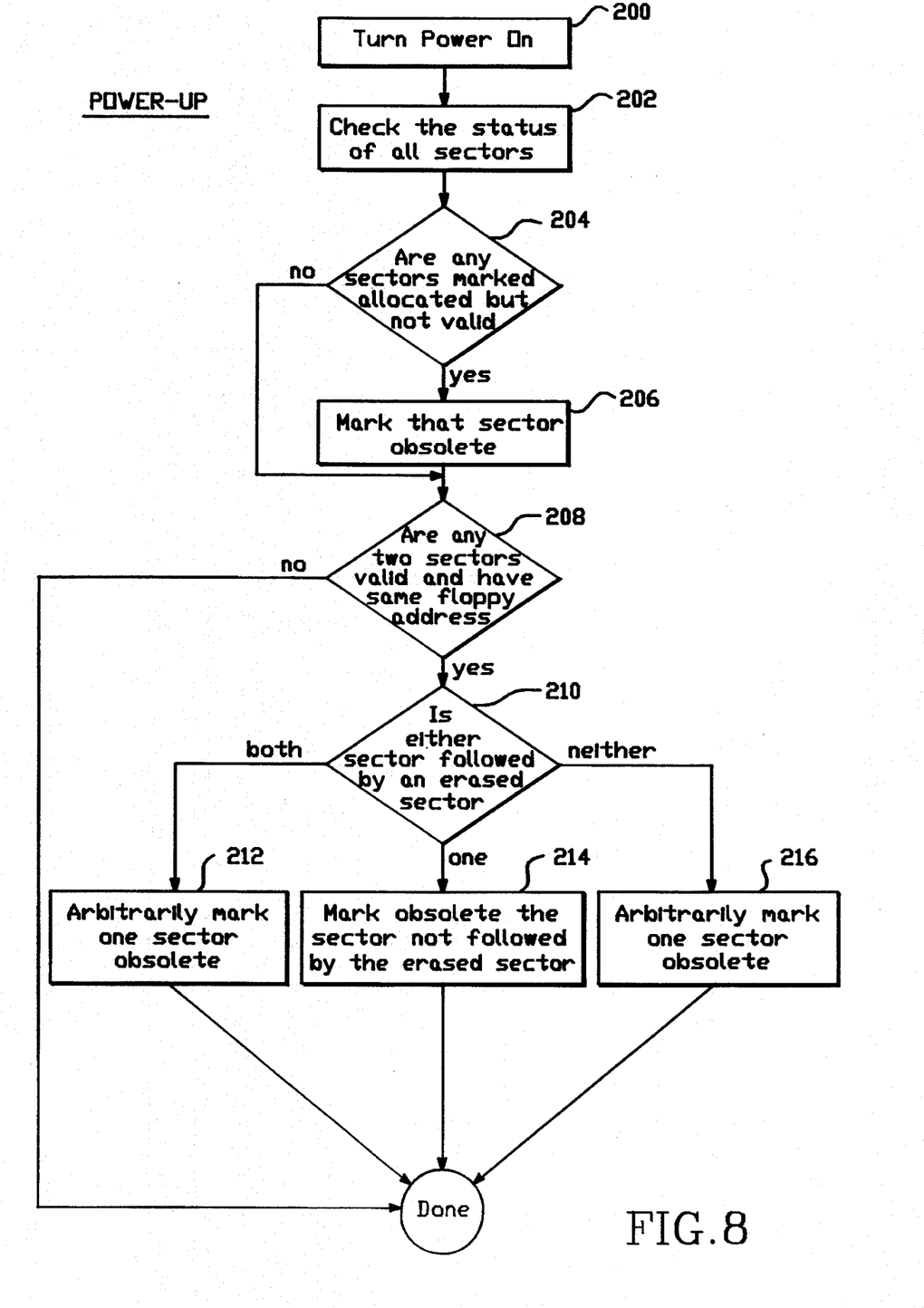
FIG. 8 is a flow chart of the power-up sequence that provides for the situation when power is terminated during a write process.

FIG. 8 is a flow chart illustrating the steps taken during power-up to provide for power fail protection. After power is turned on (step 200) the status bytes of the flash sectors are checked. The system then looks to see if any sectors are marked allocated and not valid (step 204). If any such sectors are found, those sectors are marked obsolete (step 206). The system then checks to see if any two sectors marked valid have the same floppy address (step 208). If two sectors are found with the same floppy address, then one of those sectors has to be erased. The system then checks to see whether either of the two sectors with the same floppy address is followed by an erased sector (step 210). If both are followed by an erase sector, then arbitrarily mark one of those two sectors obsolete (step 212). If neither are followed by an erase sector, then arbitrarily mark one of those two sectors obsolete (step 216). If one of the sectors is followed by an erase sector, mark the other sector obsolete (step 214).

The most likely scenario is that if two sectors do have the same floppy address, then one of them will be followed by an erase sector. This is because when a new sector of data is written to the flash EPROM memory module, it is probably written in a block that has been erased or has a lot of erased sectors. The system writes through a flash block sequentially. Typically, there will be a plurality of sectors that are erased. The system will write to the first erased sector, which will be followed by an erased sector. Therefore, in most cases where, at power-up, two flash sectors are valid and have the same floppy address, one of the sectors will be followed by an erased sector.

Idle Time Reorganization (Recycling)

During idle time, the firmware will reorganize the flash disk in order to make efficient use of space on the flash EPROM memory module and prepare for subsequent write operations. This cannot be overdone because there are limits on the number of times a flash EPROM may be written and erased. Rather than constantly reorganizing to optimize spare space, it is appropriate to rebuild the spare pool once it reaches a low threshold of space available. It is also inappropriate to try to recover all invalid sectors in this process. It is better only to rebuild the pool to a predetermined higher level. Toward this end there are some operations that are always beneficial; for example, the preparation of obsolete sectors for erasure. Other operations should only be undertaken when the low threshold of spare space has been reached; for example, recycling.

When none of the operations directly associated with reading and writing are taking place, the firmware is considered to be idle. There are two distinct categories of idle time. First, when a read is fully prepared but still in progress, the firmware has little to do, but may be called upon at any moment to handle stepping, head selection or writing. Second, when the motor has been turned off by the floppy disk controller, the firmware has nothing to do at all. This motor off time may be further characterized by its duration. For instance, it may be deemed relatively unlikely that the disk will be used again soon after it has been idle for several minutes. When the disk, or in this case the flash EPROM memory module, has been idle for a predetermined time interval, the state of the apparatus is characterized as floppy idle time.

During floppy idle time, the top priority activity is the preparation for erasure of currently obsolete sectors. This can be a relatively slow process, so it is best to get it out of the way as soon as possible. It is also easy to restart this process if it has been interrupted; therefore, it can be done while the motor is on.

Recycling is an attempt to rebuild the pool of spare sectors by shuffling data and erasing blocks. But while it is in progress, it can actually deplete the pool. When a block is almost entirely prepared for erasure, it may be appropriate to recycle it. In the preferred embodiment, recycling will not be undertaken with the motor running. Recycling will only take place during floppy idle time.

Figure 9:
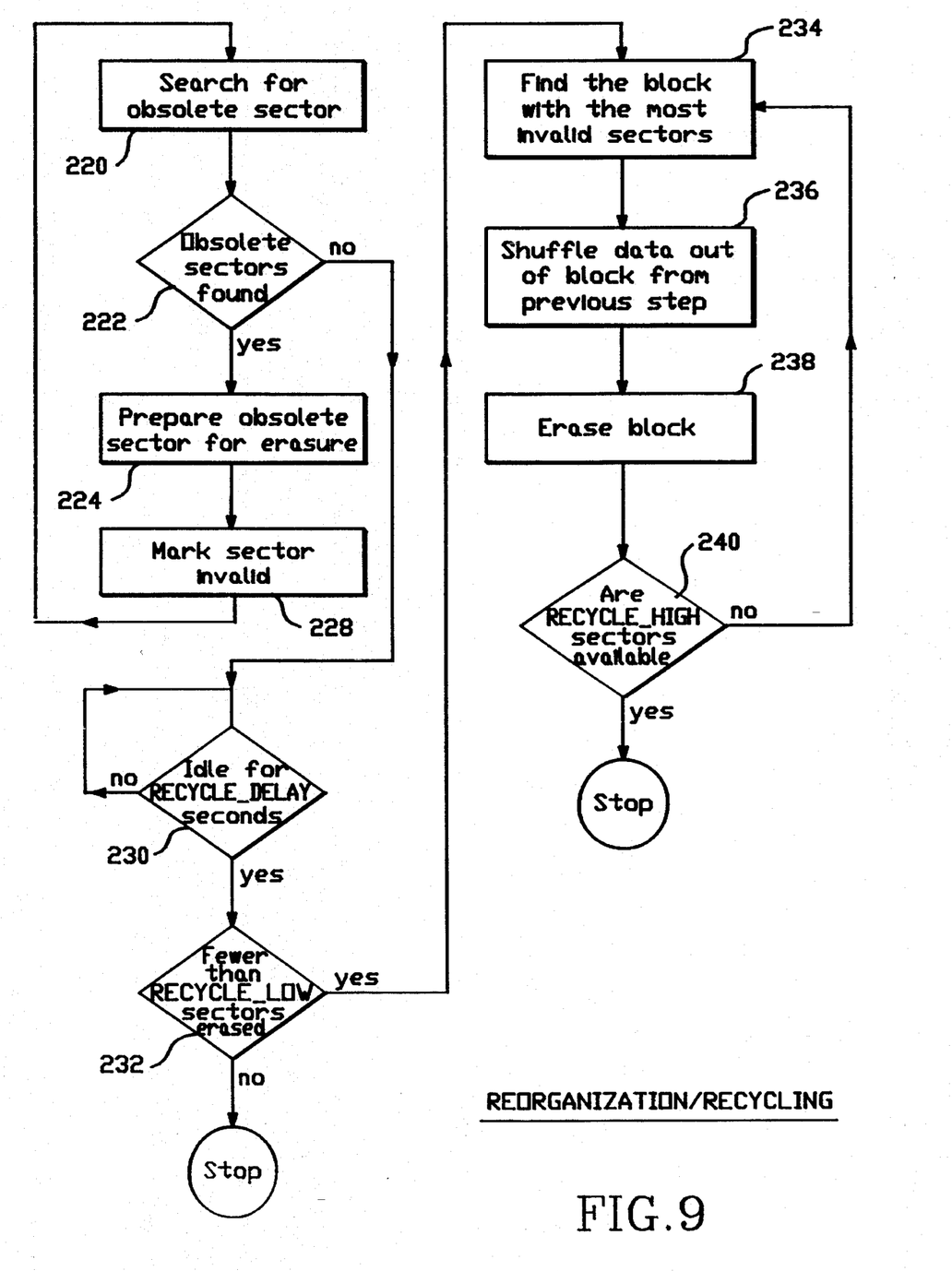
FIG. 9 is a flow chart of the reorganization process.

FIG. 9 is a flow chart illustrating the steps of the recycling process. When a read is fully prepared but still in progress, the firmware has little to do. At this time, the firmware can search the EPROM for obsolete sectors (step 220). When it finds a sector that is obsolete (step 222), it can prepare that sector for erasure (step 224). After preparing a sector for erasure, it marks that sector as invalid (step 228). After marking the sector invalid, the firmware will then search for more obsolete sectors (step 220). This loop will continue until all obsolete sectors are prepared for erasure and marked invalid. Even if, during the loop, the floppy disk controller signals for the motor to be turned off, the process will still continue until all obsolete sectors have been marked invalid. After all obsolete sectors have been marked invalid, the firmware will then decide whether the floppy idle time has been for more than RECYCLE_DELAY seconds (step 230). RECYCLE_DELAY is a predetermined constant. If the idle time is greater than RECYCLE_DELAY seconds, the next step is to see how many sectors are erased. If the number of sectors erased, thus available for writing, is below a threshold, then recycle (step 232). The next step is to find the block with the most invalid sectors (step 234). The block with the most invalid sectors is the first block that will actually be erased. All of the valid data must be rewritten into other blocks. In step 236, firmware determines which block has the least amount of invalid sectors. This block will be filled first. The block with the second least amount of invalid sectors is the second block to be filled if there is any data that does not fit into the block to be filled first, and so on.

All the data that is valid from the block to be erased is then written into blocks that will be saved according to the algorithm of the last two sentences (step 236). In effect what is happening in step 236 is that data is being shuffled from a block to be erased to a block that is going to be saved. Once the block identified in step 234 has been emptied and prepared for erasure, it is then erased (step 238). The firmware then decides whether it wants to continue recycling or to stop the recycling process (step 240) by looking at how many erased sectors are now available to be written to. If it is above a certain threshold, then it stops the process (step 240). If not, find the next block with the most invalid sectors (step 234) and prepare to transfer all the data out of that block into the block with the least amount of invalid sectors (step 236). Thus, what happens is that the reshuffle process is repeated (steps 234–240) until a predetermined threshold number of sectors are erased.

Retirement

Retirement is a recycling operation, but the block to be recycled is chosen on the basis of a low erase count rather than on the basis of its currently obsolete or invalid sectors. The top candidate for such recycling will be that block which has the lowest erase count among all blocks which have spare sectors. Retirement may be considered after all of the idle time activities are completed, because it can significantly deplete the spare pool while it is in progress. In addition, retirement will only be undertaken if one of the blocks currently containing spare sectors has an Erase Count RETIRED-DIF greater than that of the block with no spares which has the lowest erase count. Once retirement has been undertaken, recycling will continue with these priorities until the entirety of the block to be retired from the spare pool has been rewritten. This will result in filling the frequently erased block with data from the blocks that have been least erased.

Figure 10:
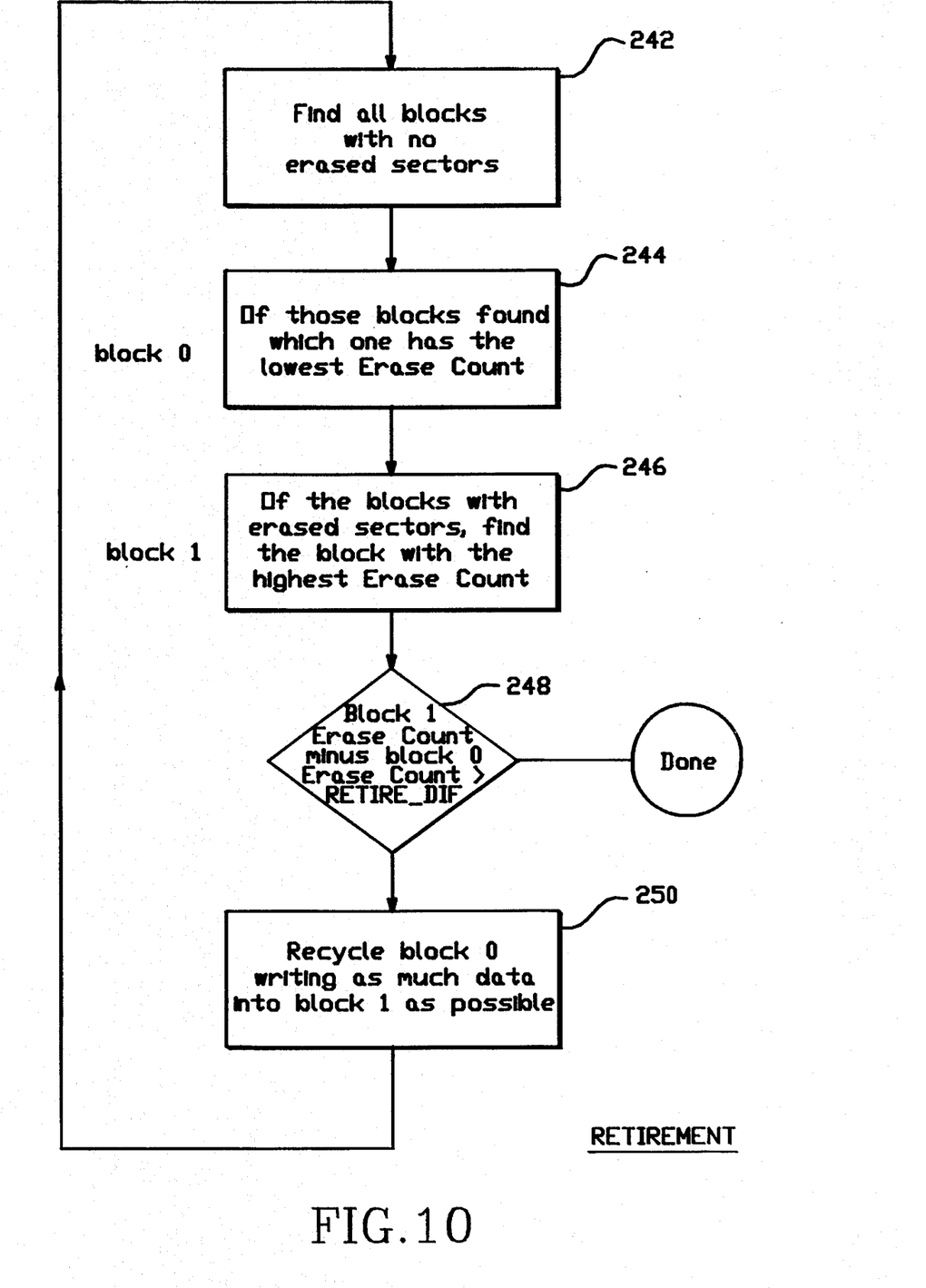
FIG. 10 is a flow chart of the retirement process.

FIG. 10 is a flow chart illustrating the steps for the retirement process. The first step is to find all the blocks with no erased sectors (step 242). Of those blocks found determine which one has the lowest Erase Count (step 244). The Erase Count 94 is part of the organization information (see FIG. 4). That block, for illustration purposes, will be labelled block 0. Of the blocks with erased sectors, find the block with the highest Erase Count (step 246). That block will be labelled, for illustration purposes, block 1. The firmware then determines whether the erase count of block 1 is greater than the erase count of block 0 by some threshold (step 248). That threshold is referred to as a RETIRE_DIF. If the difference in the erase counts is not greater than this threshold, then there will be no retirement. If it is greater than this threshold, then we will recycle block 0 using the recycle algorithm of FIG. 9 except that as much as space permits of the data that is being reshuffled will be written to block 1 (step 250). Data that cannot be written to block 1 will be written into the block with the most erased sectors available at that time. After block 0 is retired we will go back and repeat the process finding the next block with no erased sectors that has the lowest erase count (going back to step 244). The foregoing description of a preferred embodiment of the invention has been presented for purposes of illustration and description. It is not intended to be exhaustive or to limit the invention to the precise form disclosed, and obviously many modifications and variations are possible in light of the above teaching. The apparatus for emulating a floppy disk drive using Flash EPROMs was chosen and described in order to best explain the principles of the invention and its practical application to thereby enable others skilled in the art to best utilize the invention in various embodiments and with various modifications as are suited to particular use contemplated. It is intended that the scope of the invention be defined by the claims appended hereto.

What is claimed is:

1. An apparatus for transferring data between a floppy disk controller and a flash EPROM memory module, wherein the floppy disk controller operates under a first protocol and transmits a request to write data to a floppy disk, and the flash EPROM memory module operates under a second protocol, the flash EPROM memory module being used to emulate a floppy disk, said apparatus comprising:

a port for providing an interface between the flash EPROM memory module, and the floppy disk controller;

a data path for communicating data between the floppy disk controller and said port;

control means for managing the port and data path, said control means enabling a read mode for the floppy disk controller, and in response to the request to write data from the floppy disk controller, disabling said read mode and enabling a write mode, then preventing the floppy disk controller from returning to said read mode until writing to the flash EPROM memory module is complete to compensate for differences between the first protocol and the second protocol, said control means enables said read mode and said write mode by transmitting an address mark to the floppy disk controller, said control means further managing the organization of data on the flash EPROM memory module in order to emulate a floppy disk, said data stored in the flash EPROM memory module in blocks, each block comprising, a plurality of organizational sectors comprising organizational information which includes a corresponding emulated floppy address and status information as to whether a sector is allocated, valid or obsolete, and a plurality of data sectors comprising a state field for storing one of a plurality of states and a data field for storing data, said plurality of states including valid, indicating valid data in the data field; obsolete, indicating data that is no longer valid in the data field; invalid, indicating that the data field is prepared for erasure; erased, indicating that the data field is ready to be written to; or allocated, indicating that a floppy disk sector is represented in the data field and the write process has begun;

power up means, responsive to initiating power to said apparatus, for verifying the integrity of the data on the flash EPROM, said power up means further comprising:

checking means for reading said organizational information for the data stored on the flash EPROM memory module, marking means, responsive to the checking means, for marking said organizational sector obsolete if power to said apparatus was terminated before a write operation to said organizational sector was completed, said marking means further comprising:

first means for marking said organizational sector obsolete if said organizational sector is allocated for storage of data without the data being valid, and second means for marking obsolete one of two organizational sectors having the same floppy address; and reorganization means, responsive to a minimum period of floppy disk idle time, for reorganizing the data on the flash EPROM memory module, including:

invalidating means for preparing sectors for erasure, determination means for choosing which blocks should be erased and which blocks should be filled with data, shuffle means for transferring data from a block chosen by the determination means to be erased to a block chosen by the determination means to be filled with data, and means for erasing blocks.

2. An apparatus for transferring data between a floppy disk controller and a flash EPROM memory module, wherein the floppy disk controller operates under a first protocol and transmits requests to write data to a floppy disk, and the flash EPROM memory module operates under a second protocol, the flash EPROM memory module being used to emulate a floppy disk, said apparatus comprising:

a port for providing an interface between the flash EPROM memory module and the floppy disk controller;

a data path for communicating data between the floppy disk controller and said port; and control means for managing the port and data path, said control means enabling a read mode for the floppy disk controller, and in response to the request to write data from the floppy disk controller, disabling said read mode and enabling a write mode, then preventing the floppy disk controller from returning to said read mode until writing to the flash EPROM memory module is complete to compensate for differences between the first protocol and the second protocol, said control means further managing the organization of data on the flash EPROM memory module in order to emulate a floppy disk, the data stored in the flash EPROM memory module in blocks, each block comprising a plurality of data sectors and a plurality of organizational sectors, said organizational sectors comprising organizational information; and reorganization means, responsive to a minimum period of floppy disk idle time, for reorganizing the data on the flash EPROM memory module, said reorganization means further comprising:

invalidating means for preparing sectors for erasure, determination means for choosing which blocks should be erased and which blocks should be filled with data, shuffle means for transferring data from a block chosen by the determination means to be erased to a block chosen by the determination means to be filled with data, and means for erasing blocks.

3. The Apparatus of claim 2, wherein said data sector comprises a state field for storing one of a plurality of states and a data field for storing data, said plurality of states including valid, indicating valid data in the data field; obsolete, indicating data that is no longer valid in the data field; invalid, indicating that the data field is prepared for erasure; erased, indicating that the data field is ready to be written to; or allocated, indicating that a floppy disk sector is represented in the data field and the write process has begun.

4. The Apparatus of claim 3 wherein said organizational information includes status information as to whether each sector is allocated, valid or obsolete.

5. The Apparatus of claim 4, wherein said control means enables said read mode and said write mode by transmitting an address mark to the floppy disk controller in order to compensate for differences between the first protocol and the second protocol.

6. The Apparatus of claim 5, further comprising power up means, responsive to initiating power to said apparatus, for verifying the integrity of the data on the flash EPROM memory module.

7. The Apparatus of claim 2, wherein said port provides the interface with the Flash EPROM card comprising a plurality of Flash EPROMS.

8. The Apparatus of claim 7, wherein said data path includes an MFM encoder and an MFM decoder.

* * * * *